United States Patent
Mishra

(10) Patent No.: US 11,700,150 B2
(45) Date of Patent: Jul. 11, 2023

(54) ALLOCATION OF TOKENS FOR NETWORK PACKETS BASED ON APPLICATION TYPE

(71) Applicant: VMWARE, INC., Palo Alto, CA (US)

(72) Inventor: Indresh Mishra, Pune (IN)

(73) Assignee: VMware, Inc., Palo Alto, CA (US)

( * ) Notice: Subject to any disclaimer, the term of this patent is extended or adjusted under 35 U.S.C. 154(b) by 734 days.

(21) Appl. No.: 16/581,789

(22) Filed: Sep. 25, 2019

(65) Prior Publication Data

US 2021/0036890 A1 Feb. 4, 2021

(30) Foreign Application Priority Data

Jul. 31, 2019 (IN) .............................. 201941030936

(51) Int. Cl.
*H04L 12/46* (2006.01)
*G06F 9/455* (2018.01)
*H04L 9/40* (2022.01)

(52) U.S. Cl.
CPC .......... *H04L 12/4645* (2013.01); *G06F 9/455* (2013.01); *H04L 63/0245* (2013.01); *H04L 2212/00* (2013.01)

(58) Field of Classification Search
CPC ............. H04L 12/4645; H04L 63/0245; H04L 2212/00; G06F 9/455
See application file for complete search history.

(56) References Cited

U.S. PATENT DOCUMENTS

| | | | |
|---|---|---|---|
| 9,491,098 B1* | 11/2016 | Wilson | H04L 47/125 |
| 9,509,616 B1* | 11/2016 | Judge | H04L 47/20 |
| 9,542,546 B2* | 1/2017 | Wallis | H04L 63/0807 |
| 2002/0174341 A1* | 11/2002 | Logue | H04L 63/123 |
| | | | 713/179 |
| 2005/0198197 A1* | 9/2005 | Yoshiuchi | G06F 9/54 |
| | | | 709/217 |
| 2006/0098663 A1* | 5/2006 | Shore | H04L 29/12009 |
| | | | 370/389 |
| 2009/0241170 A1* | 9/2009 | Kumar | H04L 63/102 |
| | | | 370/235 |
| 2014/0003434 A1* | 1/2014 | Assarpour | H04L 69/22 |
| | | | 370/392 |
| 2014/0032975 A1* | 1/2014 | Chandran | G06F 11/3037 |
| | | | 714/47.1 |
| 2017/0064749 A1* | 3/2017 | Jain | H04L 61/2571 |

* cited by examiner

*Primary Examiner* — Vance M Little

(57) ABSTRACT

Described herein are systems, methods, and software to manage the deployment and use of application identifier tokens in a distributed firewall environment. In one implementation, a computing environment generates tokens associated with application types executing on virtual nodes in the computing environment. After generating the tokens, the computing environment provides at least one token of the tokens to each of the virtual nodes based on at least one application type executing on the virtual node. When a communication is identified in the virtual node associated with an application, the virtual node may encapsulate the communication and a corresponding token in a packet and forward the packet via a virtual network interface associated with the virtual node.

14 Claims, 5 Drawing Sheets

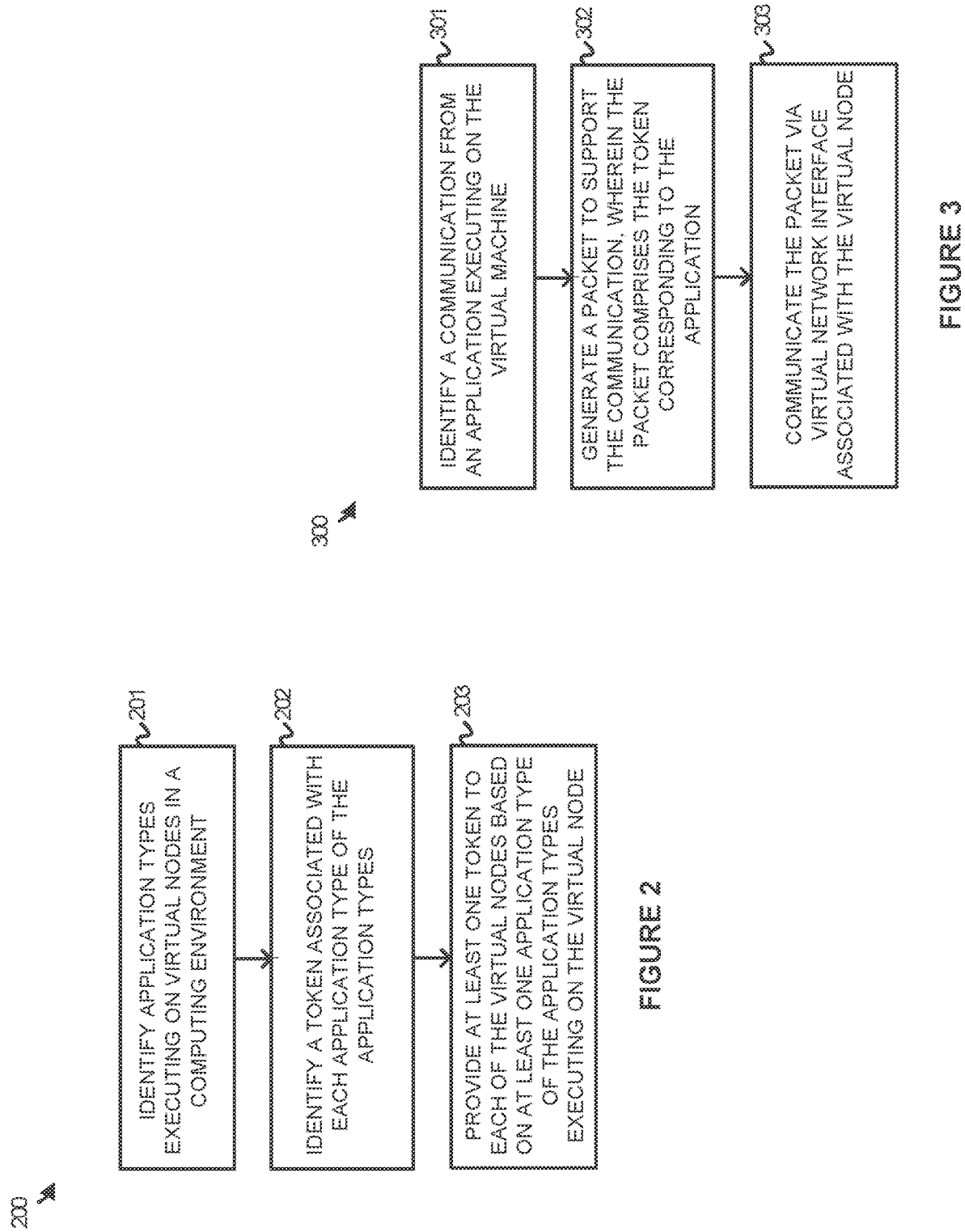

ALLOCATION OF TOKENS FOR NETWORK PACKETS BASED ON APPLICATION TYPE

RELATED APPLICATIONS

Benefit is claimed under 35 U.S.C. 119(a)-(d) to Foreign Application Serial No. 201941030936 filed in India entitled "ALLOCATION OF TOKENS FOR NETWORK PACKETS BASED ON APPLICATION TYPE", on Jul. 31, 2019, by VMWare, Inc., which is herein incorporated in its entirety by reference for all purposes.

BACKGROUND

In computing environments, software defined networks may be used that comprise software modules capable of providing a communication platform for one or more virtual nodes in the computing environment. The software defined networks, which may include logical switches, routers, distributed firewalls, and the like, may be used to intelligently direct communication on the network by inspecting packets before passing them to other computing nodes across a logical overlay network that is decoupled from the underlying physical network. For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like, within the data packet and, when identified, provide a set of actions to be asserted against the data packet. These actions may include modifications to the data packet, and forwarding rules for the data packet, amongst other possible operations.

Although software defined networks may permit efficient processing of data packets from virtualized nodes, difficulties can arise in managing the configuration of the software defined networks. These difficulties are often compounded as additional virtual nodes are added to a computing environment that can provide different applications or services for the users of a computing environment.

OVERVIEW

The technology disclosed herein manages the allocation of tokens to virtual nodes in a computing environment based on application types executing in the virtual nodes. In one implementation, a method includes obtaining a token from a network management service, wherein the token corresponds to an application executing on a virtual node. The method further includes identifying a communication from the application and generating a packet to support the communication, wherein the packet comprises the communication and the token. Once generated, the method further includes communicating the packet via a virtual network interface associated with the virtual node.

BRIEF DESCRIPTION OF THE DRAWINGS

FIG. 2 illustrates an operation to provide virtual nodes with tokens according to an implementation.

FIG. 3 illustrates an operation on a virtual node to insert tokens according to an implementation.

DETAILED DESCRIPTION

Figure 1:
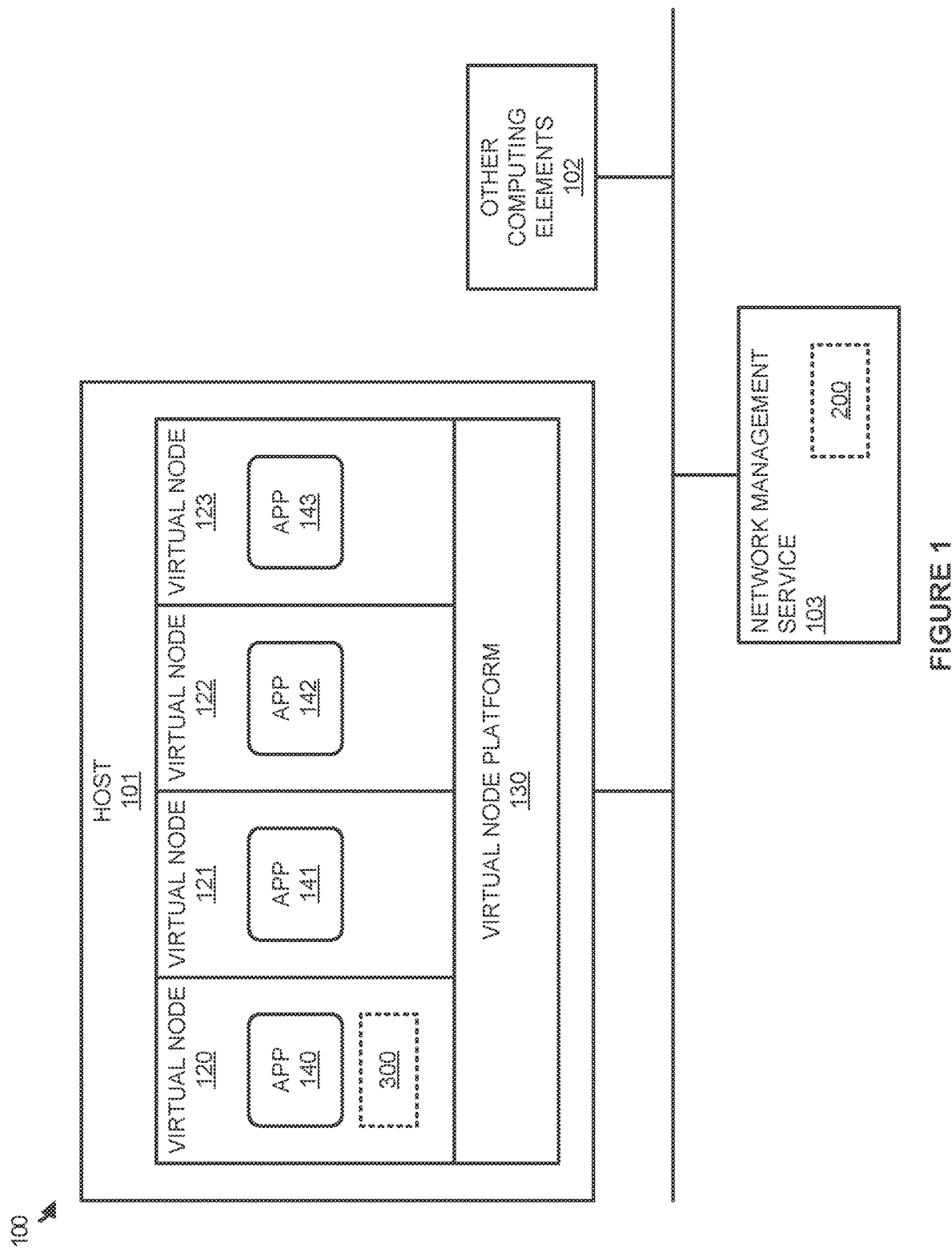
FIG. 1 illustrates a computing environment to manage application tokens according to an implementation.

FIG. 1 illustrates a computing environment 100 to manage application tokens according to an implementation. Computing environment 100 includes host 101, other computing elements 102, and network management service 103. Host 101 includes virtual nodes 120-123 and virtual node platform 130. Virtual nodes 120-123 include applications 140-143 and virtual node 120 further includes operation 300 that is further described in FIG. 3. Network management service 103 further includes operation 200 that is further described in FIG. 2. Other computing elements 102 may comprise other hosts for virtual nodes, other computing systems and services, or some other computing element.

In operation, virtual node platform 130 is used to provide abstracted resources of host 101 to virtual nodes 120-123. These abstracted resources may include processing resources, storage resources, network resources, or some other abstracted resource from host 101. In some implementations, virtual nodes 120-123 may represent virtual machines, which each include an operating system to support applications 140-143. Applications 140-143 may represent front-end request applications, back-end management applications, data processing applications, database management applications, or some other application. The applications may include one or more services that provide the desired operation and may execute in containers when virtual nodes 120-123 represent virtual machines. In other examples, virtual nodes 120-123 may represent containers. The containers may share resources from the host 101, wherein the resources may include kernel resources from the host operating element and may further include repositories and other approved resources that can be shared with other containers or processes executing on the host. However, although resources may be shared between the containers on a host, the containers are provisioned to have private access to the operating system with their own identifier space (hereinafter namespace), file system structure, and network interfaces. The operating system may also be responsible for allocating processing resources, memory resources, network resources, and other similar resources to the containerized endpoint.

In addition to providing the platform for the execution of virtual nodes 120-123, virtual node platform 130 may further provide the software defined networking services required by virtual nodes 120-123. These operations may include logical switching operations, routing operations, distributed firewall operations, and the like, and may be used to intelligently direct communication on the logical overlay network by inspecting packets before passing them to other virtual nodes. This inspection may include identifying source and destination internet protocol (IP) addresses, source and destination media accesses control (MAC) addresses, a protocol, or some other attribute in the data packet. Packets may be sent to other hosts (not shown) that have virtual nodes on the same or routable logical overlay network by establishing tunnels (using Generic Network Virtualization Encapsulation (GENEVE), Virtual Extensible Local Area Network Generic Protocol Extension (VXLAN GPE) with Network Service Header (NSH) protocol to provide variable length context headers, or some other encapsulation packets) between hosts.

Here, to efficiently manage enforcement of communications by virtual nodes 120-123, network management service 103 is provided that can supply tokens to virtual nodes 120-123. These tokens correspond to an application type associated with the applications operating on virtual nodes 120-123. For example, applications 140-141 may represent front-end applications for a web service, while applications 142-143 may represent database applications that maintain a database for the web service. As a result, virtual nodes 120-121 that correspond to applications 140-141 may be allocated a first token, while virtual nodes 122-123 that correspond to applications 142-143 may be allocated a second token. These tokens may comprise Secure Production Identity Framework for Everyone (SPIFFE) Verifiable Identity Documents (SVIDs) or some other token capable of identifying the application associated with a communication. Once the tokens are allocated, egress packets from each of the applications may be encapsulated by the corresponding virtual node, such that the tokens are included in the encapsulated packet. As an example, when a communication (packet) is generated from application 140, a token associated with application 140 is identified, and the communication is encapsulated in a packet with the token.

FIG. 2 illustrates an operation 200 to provide virtual nodes with tokens according to an implementation. The processes of operation 200 are referenced parenthetically in the paragraphs that follow with reference to systems and elements of computing environment 100 of FIG. 1. Although demonstrated as a separate network element in FIG. 1, it should be understood that network management service 103 may be implemented at least partially on host 101.

As depicted, operation 200 of network management service 103 may identify (201) application types executing on virtual nodes in computing environment 100. In some implementations, network management service 103 may implement application discovery to identify where hosts in computing environment 100 may report information about the applications that are executing on the virtual nodes of the computing environment. In other examples, a deployment service that initiates the execution of the virtual nodes may notify network management service 103 of the various application types executing in computing environment 100. For example, when virtual node 120 is initiated on host 101, the service deploying virtual node 120 may provide an application type identifier, such as metadata, to network management service 103 indicating the type of application or service provided by the virtual machine. In some instances, the application type identifier may be supplied by an administrator deploying the virtual machine, however, the application type identifier may be identified based on inspecting the virtual machine for services and software executable by the virtual machine, or by inspecting traffic issuing therefrom.

After identifying the application types in computing environment 100, operation 200 further identifies (202) a token associated with each application type of the application types. In particular, if three application types were identified within computing environment 100, network management service 103 may determine three tokens that each correspond to a different application type of the application types. The tokens may comprise SVIDs associated with each application type or may comprise any other token capable of individually identifying the application type.

Once the tokens are generated for the various application types, operation 200 also provides (203) at least one token to each of the virtual nodes based on at least one application type of the application types executing on the virtual node. For example, for virtual node 120, network management service 103 may determine an application type associated with application 140. Once the application type is determined, network management service 103 may identify a token that is associated with the application type and provide the token to virtual node 120 to support application 140. In some implementations, when multiple virtual nodes are used to provide the same application, the multiple virtual nodes may be provided with the same token. As a result, the software defined networking operations may process packets from different virtual machines in a similar manner due to the use of a shared token.

In one example, when virtual nodes are representative of virtual machines, network management service 103 may provide the token to driver or daemon that is operating on the destination virtual machine. This driver may be responsible for identifying packets that correspond to the application and generating encapsulation packets that include both the packets from the application and the token allocated to the application. These encapsulation packets may comprise Generic Network Virtualization Encapsulation (GENEVE) packets, Virtual Extensible Local Area Network Generic Protocol Extension (VXLAN GPE) packets with Network Service Header (NSH) protocol to provide variable length context headers, or some other encapsulation packets. An exemplary implementation of this architecture is described in detail in U.S. Pat. No. 10,193,749, which is incorporated herein by reference in its entirety.

In another example, when the virtual nodes are representative of containers, network management service 103 may provide the token to a sidecar or other service that assists in providing resources to the container. A sidecar is an operation that is used to provide network services to the application container, wherein the sidecar may obtain packets from the application in the container and generate encapsulation packets that include both the packets from the application and the token allocated to the packet.

In some implementations, the tokens that are provided to the applications in the virtual nodes may be valid for limited time periods. These time periods may be periodic, may correspond to randomly generated periods, or may be some other time period. As the time periods expire, network management service 103 may be required to generate new tokens for each of the applications in the virtual nodes and provide the tokens to the virtual nodes to replace the expired tokens. Additionally, information about the tokens provided to the virtual nodes may be provided to the software defined networking platform, such that the software define networking platform may perform forwarding actions on packets from the applications. The forwarding actions may include permitting the packets, blocking the packets, modifying the packets, logging the packets, or performing some other operation in relation to the packets.

FIG. 3 illustrates an operation 300 of a virtual node to insert tokens according to an implementation. The processes of operation 300 are referenced parenthetically in the paragraphs that follow with reference to the systems and elements of computing environment 100 of FIG. 1. Although demonstrated using virtual node 120, it should be understood that similar operations may be performed by virtual nodes 121-123.

As described previously, when virtual nodes are deployed in a computing environment, a network management service may identify the application types of the virtual nodes, identify or generate tokens associated with the application types, and provide the tokens to the virtual nodes in the computing environment. Once deployed, operation 300 may identify (301) a communication or packet from an application executing on the virtual node. For example, a front-end application executing in a first virtual machine may generate a packet to be communicated to a back-end application executing in a second virtual machine. When a communication is requested, operation 300 further generates (302) a packet to support the communication, wherein the packet comprises the token corresponding to the requesting application as well as the original communication from the application. In one embodiment, the token may be inserted in an option field of a GENEVE encapsulation header. Once encapsulated, operation 300 may communicate (303) the packet via a virtual network interface associated with the virtual node.

In some implementations, when virtual node 120 corresponds to a virtual machine, the generation of the packet may occur using a driver on the virtual machine. The driver may be capable of identifying communications from applications on the virtual machine and encapsulating the packet as required for the virtual machine. In other implementations, when virtual node 120 corresponds to a container, the generation of the packet may occur using a sidecar that is used as a proxy interface for the container. The sidecar may be capable of identifying packets from the application in the container, identifying a token associated with the requesting application, and generating the encapsulated packet that includes at least that original packet from the application and the token. The encapsulated packets may comprise GENEVE packets, VXLAN GPE packets, or some other encapsulation packets.

Once the packets are communicated via the virtual network interface associated with the virtual node, virtual node platform 130 may inspect the packets to identify at least the token within the encapsulated packet. The inspection may be used to perform forwarding actions in association with the packet including permitting the packet to be forwarded to its destination, blocking the packet, modifying the packet, caching the packet in a log, or providing some other operation in association the packet. For example, forwarding rules maintained by virtual node platform may indicate that any communication from application 140 cannot be communicated to application 143. As a result, when an encapsulation packet indicates an application type associated with application 140, virtual node platform may block the communication as per the forwarding rule.

Figure 4:
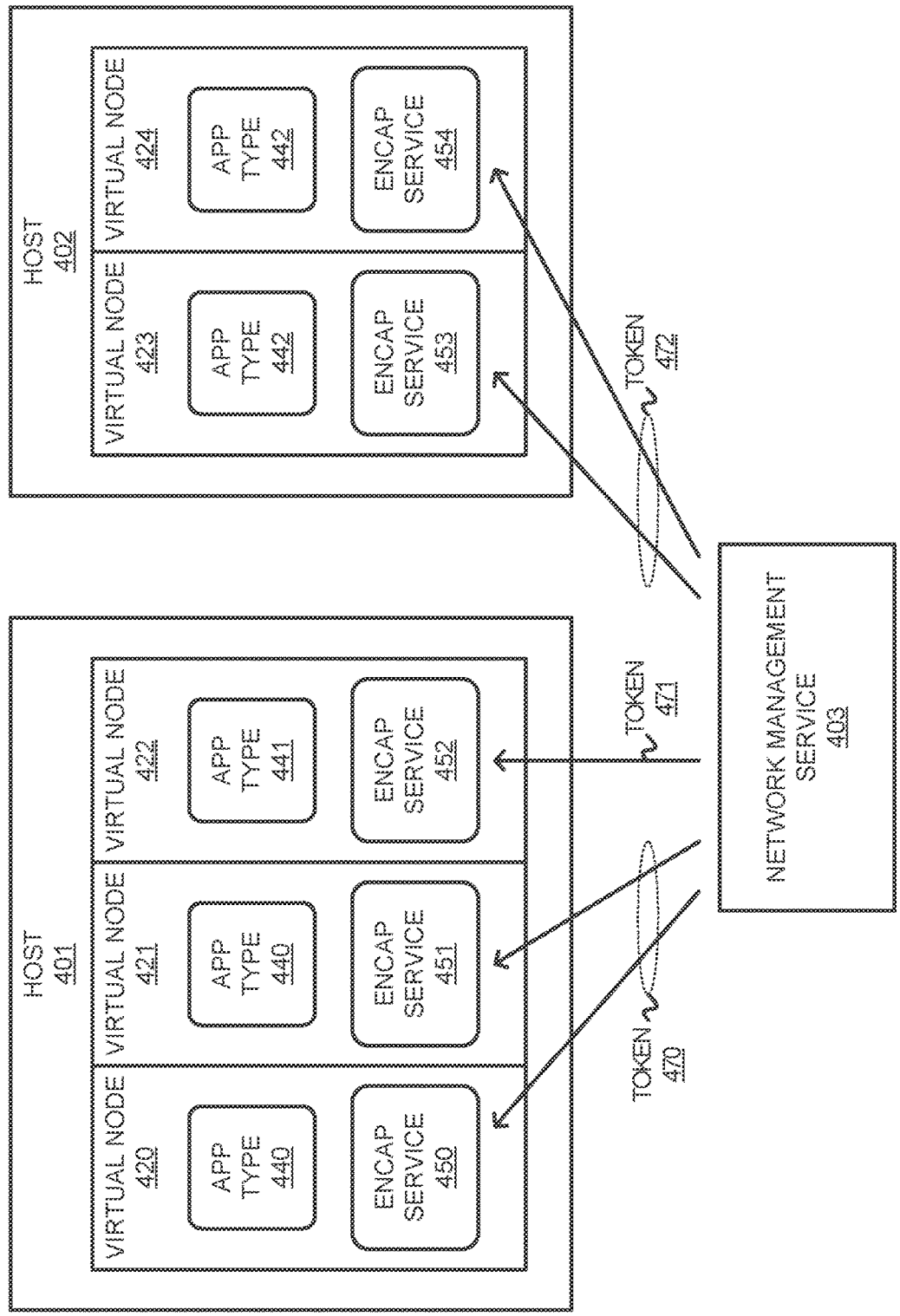
FIG. 4 illustrates an operational scenario of deploying tokens to virtual nodes according to an implementation.

FIG. 4 illustrates an operational scenario 400 of deploying tokens to virtual nodes according to an implementation. Operational scenario 400 includes hosts 401-402 and network management service 403. Hosts 401-402 further include virtual nodes 420-424, which each implement a corresponding encapsulation service 450-454. In addition to the application services, virtual nodes 420-421 include applications of application type 440, virtual node 422 includes an application of application type 441, and virtual nodes 423-424 include applications of application type 442.

In operation, network management service 403 may implement an operation to identify application types executing in virtual nodes of a computing environment. In some implementations, the application type information may be supplied from a service deploying the virtual nodes in the computing environment, wherein the application type information may be defined manually by an administrator or may be determined based on processes installed on the virtual node. In other implementations, the application type information may be supplied automatically or by request from hosts 401-402, where hosts 401-402 may communicate information about the deployed virtual nodes to network management service 403 to define the applications on the virtual node.

After determining the application types that are deployed in the computing environment, network management service 403 will generate or identify tokens associated with each of the application types. These tokens may be generated based on the SPIFFE requirements, may be generated via a random value generator, or may be generated in some other manner. Here, tokens 470-472 are generated that each correspond to application types 440-442. Once generated, network management service 403 may provide tokens 470-472 to encapsulation services 450-454. In some examples, virtual nodes 420-424 may represent virtual machines and encapsulation services 450-454 may represent communication drivers capable of identifying packets from the applications and encapsulating the packets with a token from tokens 470-472. In other examples, virtual nodes 420-424 may represent containers and encapsulation services 450-454 may represent a sidecar for the container, wherein the sidecar can be used to add functionality to the container, such as security services or encapsulation services associated with communications for the container. In some examples, the encapsulation services may comprise operations or containers (sidecars) that exist outside of virtual nodes 420-424 and are coupled to the interfaces of virtual nodes 420-424. Although demonstrated as a single encapsulation service for each of the virtual nodes, it should be understood that virtual nodes may share an encapsulation service in these examples.

Once tokens 470-472 are provided to the corresponding encapsulation services, the encapsulation services may be used to identify packets from the applications and encapsulate the packets with the corresponding tokens. Thus, encapsulation services 450-451 may encapsulate packets with token 470, encapsulation service 452 may encapsulate packet with token 471, and encapsulation services 453-454 may encapsulate packets with token 472.

In some examples, the tokens that are provided to the encapsulation services may expire periodically, at random intervals, or at some other interval. When a token expires, network management service 403 may generate a new token for the application type and provide the token to the corresponding encapsulation service. Additionally, network management service 403 may update other portions of the software defined networks to indicate the new token and corresponding application type. Advantageously, the software defined networking operations, such as firewall operations, may identify any new tokens and provide forwarding actions based on the identified token.

Figure 5:
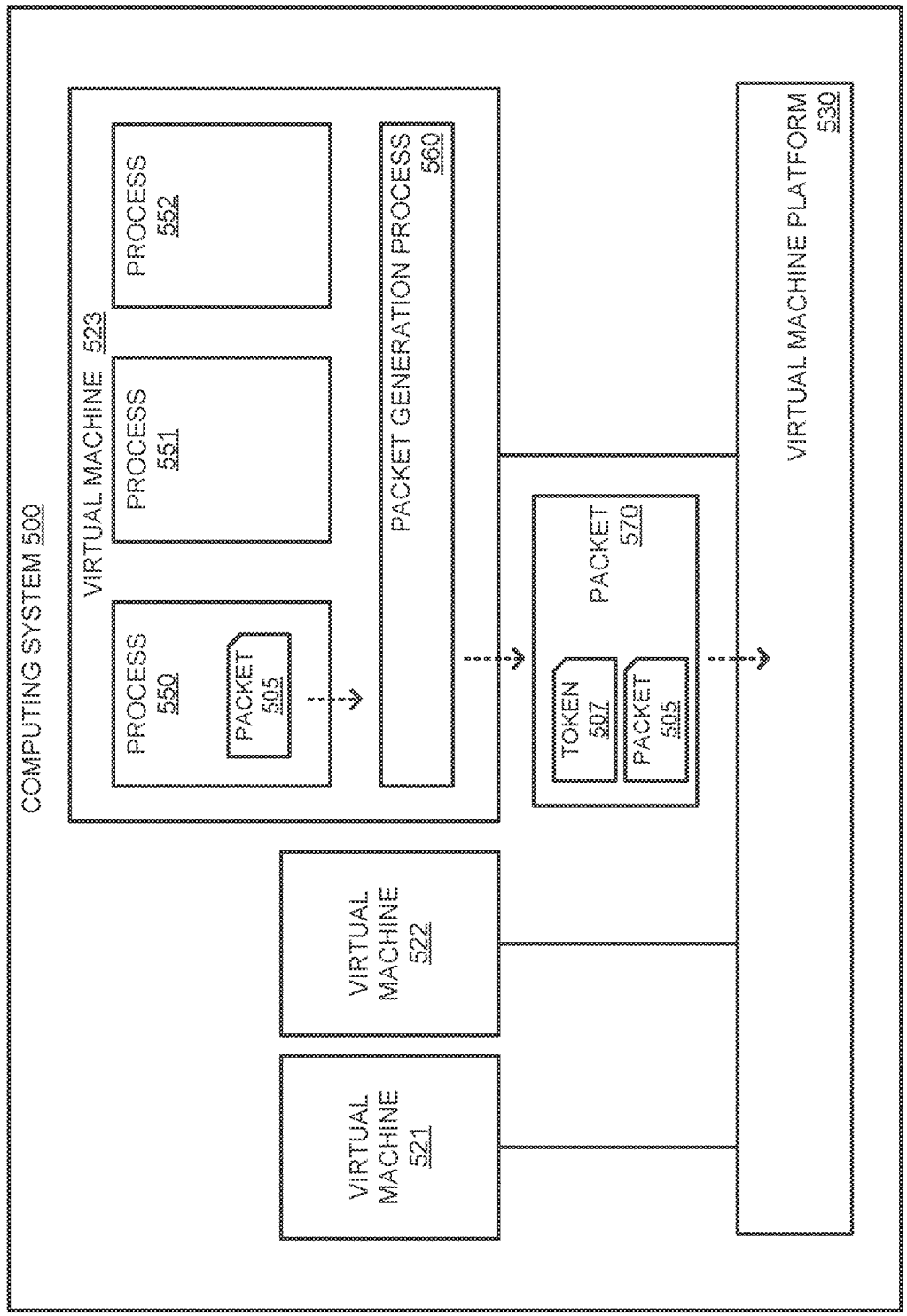
FIG. 5 illustrates an operational scenario of generating and processing a data packet from a virtual node according to an implementation.

FIG. 5 illustrates an operational scenario of generating and processing a data packet from a virtual node according to an implementation. The operational scenario includes computing system 500 with virtual machines 521-523 and virtual machine platform 530. Virtual machine 523 includes processes 550-552 that correspond to one or more applications and packet generation process 560. The operational scenario further includes packet 505 and packet 570 that encapsulates token 507 and packet 505.

In operation, virtual machine platform 530 abstracts the physical components of computing system 500 and provides the abstracted components to virtual machines 521-523. The abstracted components may include processing system resources, memory resources, storage resources, network resources, or some other resource of computing system 500. To provide the communications virtual machines 521-523, each virtual machine of virtual machines 521-523 may include a packet generation process that operates as driver or some other executable capable of encapsulating data or packets from applications operating on the virtual machines. Here, virtual machine 523 includes processes 550-552 that are representative of processes associated with one or more applications in a computing environment. These applications may include front-end applications, back-end applications, database management applications, or some other applications. When a packet 505 is generated by process 550, the packet is identified by packet generation process 560. Packet generation process 560 then generates packet 570 that encapsulates the data (packet 505) from process 550 with token 507, wherein token 507 corresponds to an application specific identifier that can be used by software defined network operations to implement forwarding actions associated with the application.

In some implementations, a network management service may perform application discovery for a computing environment to identify the various application type operating in the computing environment. These application types may be defined by an administrator, may be identified based on the services operating on each virtual machine, or may be identified in any other manner. For example, when a virtual machine is deployed in a computing environment, the administrator associated with the virtual machine may define the application type associated with the application. Once the application types are identified for the virtual machines, the network management service may identify or generate a token for each of the application types and provide the tokens to the virtual machines in the computing environment. As an example, all virtual machines associated with a front-end application may be supplied with a first token that corresponds to the front-end application, while all virtual machines that are associated with a back-end application may be supplied with a second token.

After the tokens are supplied to the corresponding virtual machines, or drivers executing on the virtual machines, data from the applications may be encapsulated using the required token. Here, when process 550 generates packet 505, packet generation process 560 identifies the packet and the application type corresponding to the packet. Once the packet is identified, packet generation process 560 generates packet 570 that encapsulates packet 505 and includes token 507 that corresponds to the application associated with process 550. Thus, if virtual machine 523 were representative of a front-end virtual machine, packet generation process 560 may add a token 507 that corresponds to the front-end application type. After generating packet 570, the packet is forwarded over a virtual network interface to virtual machine platform 530.

In some implementations, virtual machine platform 530 may be provided with information about the tokens that are allocated to each of the various application types. This information may be provided as a table, array, or some other data structure that associates each of the application types with a corresponding token. From the token information, virtual machine platform 530 may perform packet inspection to identify the token associated with the packet and apply forwarding rules based on the token. Thus, if the packet included a token that corresponded to a front-end application, the virtual machine platform may identify one or more forwarding rules that apply to front-end applications. The forwarding actions may include permitting the packet to be transferred to a destination element, blocking the packet, modifying the packet, or providing some other operation with respect to the packet.

In some examples, token 507 that is provided to virtual machine 523 may be associated with an expiration time. This expiration time may be periodic, may be random, or may be some other interval. When the token expires, the network management service may generate a new token and provide the new token to virtual machine 523. Advantageously, the updates to the tokens may prevent malicious operations from mimicking an application type in the computing environment.

Although demonstrated in the example of FIG. 5 as encapsulating packets in a virtual machine, it should be understood that similar operations may apply to containers. In some implementations, rather than executing within the container, a sidecar may execute as a separate container or operation in conjunction with the container to provide the encapsulation operations described herein.

Figure 6:
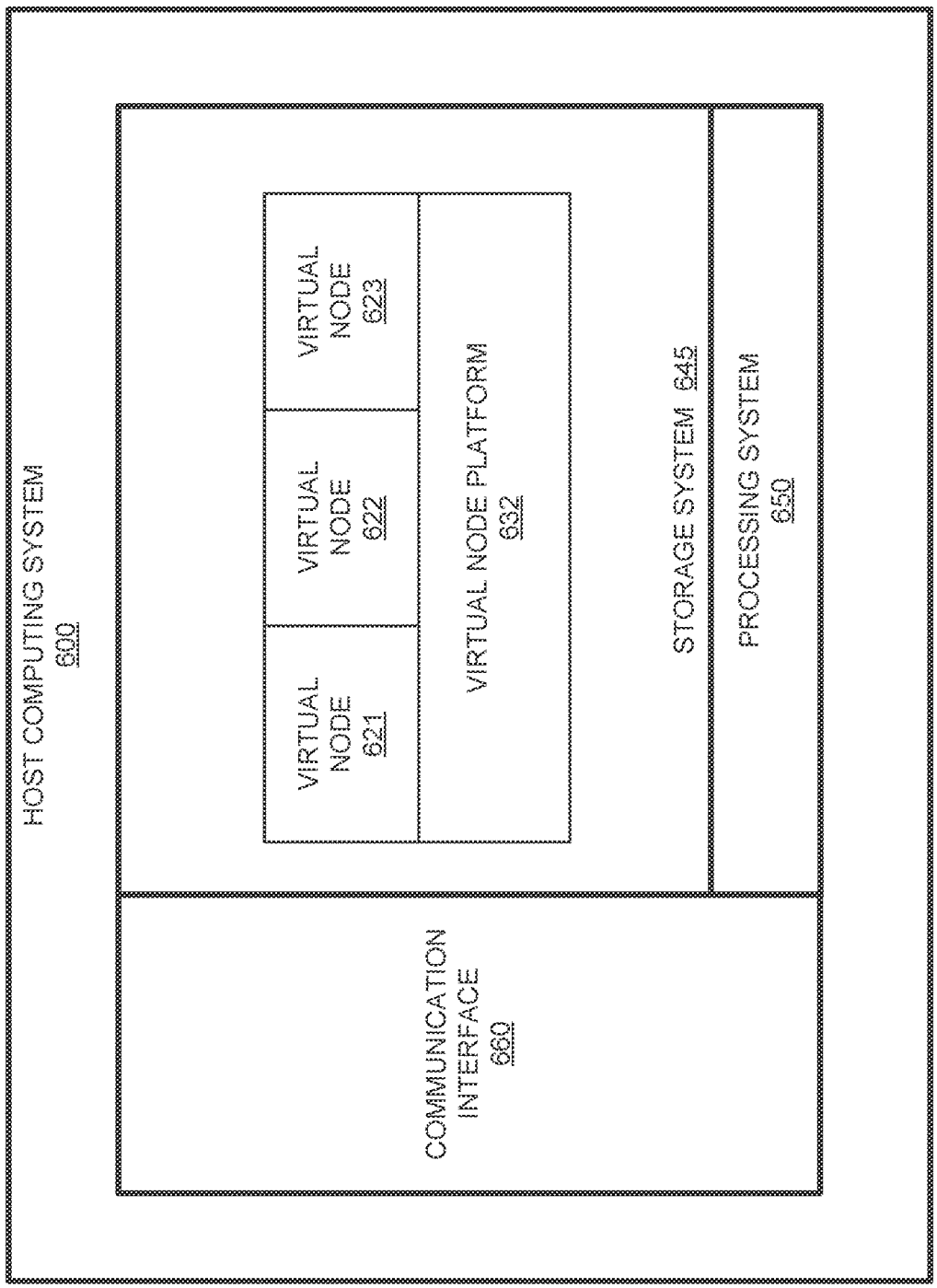
FIG. 6 illustrates a host computing system for virtual nodes according to an implementation.

FIG. 6 illustrates a host computing system 600 according to an implementation. Host computing system 600 is representative of any computing system or systems with which the various operational architectures, processes, scenarios, and sequences disclosed herein for a host can be implemented. Host computing system 600 is an example of computing element 101 of FIG. 1, although other examples may exist. Host computing system 600 includes storage system 645, processing system 650, and communication interface 660. Processing system 650 is operatively linked to communication interface 660 and storage system 645. Communication interface 660 may be communicatively linked to storage system 645 in some implementations. Host computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is an example of a physical network interface that can be configured to communicate with other computing systems to provide required operations for the processes executing on computing system 600.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises virtual node platform 632 that provides a platform for virtual nodes 621-623. The operating software on storage system 645 may further include utilities, drivers, network interfaces, applications, or some other type of software. When read and executed by processing system 650, the operating software on storage system 645 directs host computing system 600 to operate as described herein.

In at least one implementation, processing system 650 executes virtual node platform 632 to support the execution of virtual nodes 621-623. Virtual nodes 621-623 may represent full operating system virtual machines or containers, wherein each of virtual nodes 621-623 may be associated with one or more applications. To support the communications of virtual nodes 621-623, each of the virtual nodes may be provided with tokens that correspond to the application or applications on the virtual machine. These tokens may comprise SVID tokens or any other token capable of identifying an application associated with a communication. When a communication is identified from an application of a virtual machine, the communication is encapsulated with the token associated with the application and communicated via a virtual network interface associated with the virtual node. In some examples, the encapsulation packet may comprise a GENEVE packet, a VXLAN GPE packet, or some other packet capable of encapsulating the original packet from the application. Once communicated, virtual node platform 632 may perform packet inspection on the packet and determine forwarding actions to be taken based at least on the token.

In some implementations, virtual node platform 632 may perform network management service operations, such as application discovery to identify and allocate the tokens to the virtual nodes in a computing environment. In at least one example, application discovery may include obtaining application identifier information from an administrator associated with the virtual nodes, identifying processes within the virtual nodes to determine the application type, or performing some other application discovery operation. Once the various application types are identified, virtual node platform generates a token for each of the application types and provides the tokens to encapsulation services for virtual nodes 621-623. In some implementations, the encapsulation services may comprise drivers for virtual machines. In other implementations, the encapsulations services may comprise sidecars associated with containers and capable of providing the encapsulation operations for the containers.

In some examples, the network management service may generate and provide tokens for multiple hosts in a computing environment. In particular, the network management service may identify all application types that are executing in the environment, generate or identify tokens associated with each of the application types, and provide the tokens to encapsulation services associated with the various virtual nodes. Additionally, the network management service may notify software defined networking processes on the hosts and other computing elements of the current tokens associated with each of the applications. This may permit the software defined networking processes, such as firewall processes, to identify the application associated with a communication and apply forwarding actions to the packet based on the identified application.

Returning to the elements of FIG. 1, host 101 may comprise a physical host computing system or a virtual machine executing on a physical host computing system. The host may comprise communication interfaces, network interfaces, processing systems, computer systems, microprocessors, storage systems, storage media, or some other processing devices or software systems. The host may comprise software such as an operating system, logs, databases, utilities, drivers, networking software, and other software stored on a computer-readable medium.

Other computing elements 102 and network management service 103 may comprise physical computing systems, virtual machines, containers, or some other similar type of computing element. Other computing elements 102 and network management service 103 may comprise communication interfaces, network interfaces, processing systems, computer systems, microprocessors, storage systems, storage media, or some other processing devices or software systems, and can be distributed among multiple devices. Other computing elements 102 and network management service 103 may comprise software such as an operating system, logs, databases, utilities, drivers.

Communication between host 101, other computing elements 102, and network management service 103 may use metal, glass, optical, air, space, or some other material as the transport media. Communication between host 101, other computing elements 102, and network management service 103 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between host 101, other computing elements 102, and network management service 103 may be a direct link or can include intermediate networks, systems, or devices, and can include a logical network link transported over multiple physical links.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
    identifying application types associated with applications executing on virtual nodes in a computing environment;
    for each application type of the application types, generating a token associated with the application type, wherein the token is generated via a random value generator;
    providing at least one token of the tokens to each of the virtual nodes based on at least one application type of the application types executing on the virtual node;
    in a virtual node of the virtual nodes, identifying a communication from an application executing on the virtual node;

generating a packet to support the communication, wherein the packet comprises a token associated with the application type for the application;

communicating the packet via a virtual network interface associated with the virtual node;

in a firewall for the virtual nodes, determining a forwarding action for the packet based at least in part on the token;

identifying an expiration of the tokens associated with the application types;

in response to the expiration and for each application type of the application types, identifying a second token associated with the application type; and providing at least one token of the second tokens to each of the virtual nodes based on at least one application type of the application types executing on the virtual node to replace the expired tokens.

2. The method of claim 1, wherein the virtual nodes comprise virtual machines.

3. The method of claim 1, wherein the virtual nodes comprise containers.

4. The method of claim 1, wherein the communication comprises a first packet, and wherein the packet encapsulates the first packet with the token.

5. The method of claim 4, wherein the packet comprises a Generic Network Virtualization Encapsulation (GENEVE) packet or a Virtual Extensible Local Area Network Generic Protocol Extension (VXLAN GPE) packet.

6. The method of claim 1, wherein the tokens comprise Secure Production Identity Framework for Everyone (SPIFFE) Verifiable Identity Documents (SVIDs).

7. The method of claim 1, wherein the forwarding action for the packet comprises blocking the packet or permitting the packet.

8. A computing apparatus comprising:
a storage system;
a processing system operatively coupled to the storage system; and
program instructions stored on the storage system that, when executed by the processing system, direct the processing system to:
identify application types associated with applications executing on virtual nodes in a computing environment;
for each application type of the application types, generate a token associated with the application type, wherein the token is generated via a random value generator;
provide at least one token of the tokens to each of the virtual nodes based on at least one application type of the application types executing on the virtual node;
in a virtual node of the virtual nodes, identify a communication from an application executing on the virtual node;
generate a packet to support the communication, wherein the packet comprises a token associated with the application type for the application;
communicate the packet via a virtual network interface associated with the virtual node;
in a firewall for the virtual nodes, determine a forwarding action for the packet based at least in part on the token;
identify an expiration of the tokens associated with the application types;
in response to the expiration and for each application type of the application types, identify a second token associated with the application type; and
provide at least one token of the second tokens to each of the virtual nodes based on at least one application type of the application types executing on the virtual node to replace the expired tokens.

9. The computing apparatus of claim 8, wherein the virtual nodes comprise virtual machines.

10. The computing apparatus of claim 8, wherein the virtual nodes comprise containers.

11. The computing apparatus of claim 8, wherein the communication comprises a first packet, and wherein the packet encapsulates the first packet with the token.

12. The computing apparatus of claim 11, wherein the packet comprises a Generic Network Virtualization Encapsulation (GENEVE) packet or a Virtual Extensible Local Area Network Generic Protocol Extension (VXLAN GPE) packet.

13. The computing apparatus of claim 8, wherein the tokens comprise Secure Production Identity Framework for Everyone (SPIFFE) Verifiable Identity Documents (SVIDs).

14. The computing apparatus of claim 8, wherein the forwarding action for the packet comprises blocking the packet or permitting the packet.

* * * * *